United States Patent
Lee et al.

(10) Patent No.: US 9,721,441 B2
(45) Date of Patent: *Aug. 1, 2017

(54) SYSTEM AND METHOD FOR TRANSMITTING MESSAGES RELATED TO OPERATIONS OF ELECTRONIC DEVICES

(71) Applicant: Samsung Electronics Co., Ltd., Gyeonggi-do (KR)

(72) Inventors: Kangmin Lee, Gyeonggi-do (KR); Hyungrae Cho, Seoul (KR); Jihyeon Kweon, Gyeonggi-do (KR); Seokmin Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/666,978

(22) Filed: Mar. 24, 2015

(65) Prior Publication Data
US 2015/0194027 A1   Jul. 9, 2015

Related U.S. Application Data

(63) Continuation of application No. 13/661,775, filed on Oct. 26, 2012, now Pat. No. 8,988,243.

(30) Foreign Application Priority Data

Oct. 26, 2011 (KR) ........................ 10-2011-0109801

(51) Int. Cl.
*G08B 21/00* (2006.01)
*G08B 5/22* (2006.01)
(Continued)

(52) U.S. Cl.
CPC .......... *G08B 5/222* (2013.01); *H04L 12/1859* (2013.01); *H04L 12/1895* (2013.01);
(Continued)

(58) Field of Classification Search
CPC ....... G08B 5/222; H04L 12/2803; H04W 4/12
(Continued)

(56) References Cited

U.S. PATENT DOCUMENTS 5,586,174 A * 12/1996 Bogner ............... H02J 13/0024
340/533
6,157,313 A * 12/2000 Emmermann ......... G08B 5/223
340/12.54
(Continued)

FOREIGN PATENT DOCUMENTS

CN    101051976    10/2007
CN    102131016    7/2011
(Continued)

OTHER PUBLICATIONS

Stan Moyer et al., "Service Portability of Networked Appliances", Service Portability and Virtual Home Environment, IEEE Communications Magazine, Jan. 1, 2002.
(Continued)

*Primary Examiner* — Phung Nguyen
(74) *Attorney, Agent, or Firm* — The Farrell Law Firm, P.C.

(57) ABSTRACT

A system and method are provided for transmitting messages related to operations of electronic devices. A management apparatus is notified of an event that occurred in a specific one of a plurality of electronic devices. The management apparatus determines one or more target devices in response to notification of the event that occurred in the specific electronic device. An event message corresponding to the event that occurred in the specific electronic device is created. The management apparatus transmits the event message to the one or more target devices. The one or more target devices output the received event message.

16 Claims, 8 Drawing Sheets

(51) Int. Cl.
*H04L 12/28* (2006.01)
*H04W 4/02* (2009.01)
*H04W 4/20* (2009.01)
*H04L 12/18* (2006.01)
*H04L 12/58* (2006.01)

(52) U.S. Cl.
CPC .......... *H04L 12/2823* (2013.01); *H04L 51/14* (2013.01); *H04W 4/021* (2013.01); *H04W 4/20* (2013.01)

(58) Field of Classification Search
USPC .......... 340/540, 691.3, 309.16, 679, 539.26, 340/539.18; 455/11.1
See application file for complete search history.

(56) References Cited

U.S. PATENT DOCUMENTS

| | | | | |
|---|---|---|---|---|
| 6,703,930 | B2* | 3/2004 | Skinner | G08B 25/006 340/531 |
| 6,873,255 | B2* | 3/2005 | Gallagher | D06F 33/02 340/309.16 |
| 8,185,644 | B2* | 5/2012 | Simon | H04M 11/04 340/531 |
| 8,594,969 | B2* | 11/2013 | Lill | G05B 19/0428 340/539.11 |
| 9,495,859 | B2* | 11/2016 | Ha | H04L 27/28 |
| 2002/0095269 | A1 | 7/2002 | Natalini et al. | |
| 2005/0160105 | A1* | 7/2005 | Lee | G06F 3/038 |
| 2006/0271695 | A1 | 11/2006 | Lavian | |
| 2007/0261064 | A1* | 11/2007 | Jin | H04L 12/2803 719/318 |
| 2009/0100132 | A1* | 4/2009 | Ebrom | D06F 39/005 709/203 |
| 2009/0193438 | A1* | 7/2009 | Jin | H04L 12/2838 719/318 |
| 2010/0040213 | A1 | 2/2010 | Park et al. | |
| 2011/0074570 | A1 | 3/2011 | Feldstein et al. | |
| 2011/0106279 | A1 | 5/2011 | Cho et al. | |
| 2013/0082526 | A1 | 4/2013 | Lee et al. | |
| 2014/0009300 | A1 | 1/2014 | Ha et al. | |

FOREIGN PATENT DOCUMENTS

| | | |
|---|---|---|
| CN | 103891203 | 6/2014 |
| KR | 100747427 | 8/2007 |
| KR | 100791297 | 1/2008 |
| KR | 1020090082073 | 7/2009 |
| KR | 1020100043582 | 4/2010 |
| KR | 100970729 | 7/2010 |
| KR | 1020110010375 | 2/2011 |
| WO | WO 2011/053008 | 5/2011 |

OTHER PUBLICATIONS

European Search Report dated Mar. 26, 2015 issued in counterpart application No. 12843167.3-1862.
Chinese Office Action dated Jun. 29, 2016 issued in counterpart application No. 201280052832.7, 14 pages.

* cited by examiner

SYSTEM AND METHOD FOR TRANSMITTING MESSAGES RELATED TO OPERATIONS OF ELECTRONIC DEVICES

PRIORITY

This application is a continuation application of U.S. patent application Ser. No. 13/661,775, which was filed on Oct. 26, 2012, now U.S. Pat. No. 8,988,243, which claims priority under 35 U.S.C. §119(a) to a Korean patent application filed on Oct. 26, 2011 in the Korean Intellectual Property Office and assigned Serial No. 10-2011-0109801, the entire disclosure of which is incorporated herein by reference.

BACKGROUND OF THE INVENTION

1. Field of the Invention

The present invention relates generally to electronic devices, and more particularly, to a system and method that notifies a target user of events that occurred in a variety of electronic devices located in a certain area.

2. Description of the Related Art

Electronic devices may be categorized into, for example, home appliances, office appliances, medical devices, and industrial devices. Examples of electronic devices include televisions (TVs), refrigerators, washing machines, personal computers, electric fans, air-conditioners, Digital Versatile Disc (DVD) players, external loudspeakers, game devices, steam boilers, and light controllers.

Electronic devices may be connected to each other in a certain area (e.g., a home, an office, or a hospital) based on an Internet Protocol (IP), via a media system such as a gateway (GW), which forms a network (e.g., a home network). As such, when electronic devices are connected with a network including the media system, an electronic device managing system controls the electronic devices via an external device (e.g., a remote controller) connected to the media system in wireless/wired mode. The electronic device managing system allows users to control a variety of electronic devices in a certain area.

The conventional electronic device managing system allows users to control electronic devices in a network via external devices. If users wish to check use/operation states of respective electronic devices in a home network, they must directly check the corresponding electronic devices or they may roughly check via the gateway. Therefore, when network environments are developed such that a network is configured with a number of electronic devices, it may be difficult for users to check the state of each electronic device due to the electronic device managing system. In particular, if a user is outside of the area where electronic devices form a home network, the electronic device managing system does not allow the user to check the states of the electronic devices.

A conventional system may transmit messages reporting the operation states of electronic devices to all users who use them in the home network or to a pre-designated user. These messages let corresponding users acquire the related information. However, since a message transmitting system unconditionally transmits messages related to electronic devices to users without considering current user situations, the users may receive unnecessary messages. In addition, users may become overloaded by the number of messages transmitted by the message transmitting system.

SUMMARY OF THE INVENTION

The present invention has been made to address at least the above problems and/or disadvantages and to provide at least the advantages described below. Accordingly, an aspect of the present invention provides a system and method that can feed back, to a user, information regarding a variety of events that occur when electronic devices operate.

Another aspect of the present invention provides a system and method that can selectively transmit messages corresponding to events that occur when electronic devices operate to an optimal user, considering the users' situations, via an optimal notification mode.

An additional aspect of the present invention provides a system and method that can perform selective transmission of messages corresponding to events that occur when electronic devices operate, considering a variety of factors, such as, for example, a type of event, a target user, a location of a target user, a type of electronic device that a target user uses, and a state of target electronic device.

A further aspect of the present invention provides a system and method that selectively feedback messages corresponding to events that occur when electronic devices operate, to a target user that can most properly process a corresponding event, via an optimal notification mode, considering users' situations, thereby reducing unnecessary messages and enhancing user convenience.

Another aspect of the present invention provides a system and method that can perform a selective transmission of messages when electronic devices operate, thereby preventing unnecessary messages from being created and transmitted, which prevents overloading the system managing electronic devices.

In accordance with an embodiment of the present invention, a method is provided for transmitting messages related to operations of electronic devices. A management apparatus is notified of an event that occurred in a specific one of a plurality of electronic devices. The management apparatus determines one or more target devices in response to notification of the event that occurred in the specific electronic device. An event message corresponding to the event that occurred in the specific electronic device is created. The management apparatus transmits the event message to the one or more target devices. The one or more target devices output the received event message.

In accordance with another embodiment of the present invention, a method is provided for transmitting messages related to operations of electronic devices. An event notification message is received reporting that an event occurred in a specific electronic device. A type of the event is determined based on the event notification message. A target user who uses the specific electronic device is extracted, when the type of the event has a low level of urgency. All target users that can receive a message reporting the event are extracted, when the type of the event has a high level of urgency. One or more target devices are determined based on the extracted one or more target users. The message reporting that the event occurred in the specific electronic device is transmitted to the one or more target devices.

In accordance with another embodiment of the present invention, a method is provided for transmitting messages related to operations of electronic devices. An alarm signal is output based on reception of an event message from a management apparatus. It is determined whether a user has checked the received event message. A message informing that the user has checked the received event message is created and the message is transmitted to the management apparatus, when the user has checked the received event message. The event message is output, when the user has checked the received event message. A user interface for forwarding the event message is output according to a request of the user. A specific target, to which the event message is to be forwarded, is selected via the user interface. The event message is forwarded to the specific target.

In accordance with another embodiment of the present invention, there is provided a computer-readable recording medium on which a program for executing the method in a processor is recorded.

In accordance with another embodiment of the present invention, a message transmitting system is provided. The system includes a plurality of electronic devices. The system also includes a management apparatus for identifying an electronic device where an event occurs, determining one or more target devices to report the event that occurred in the electronic device, and transmitting an event messages based on the event to the one or more target devices. The system further includes the one or more target electronic devices for outputting the event message from the management apparatus.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
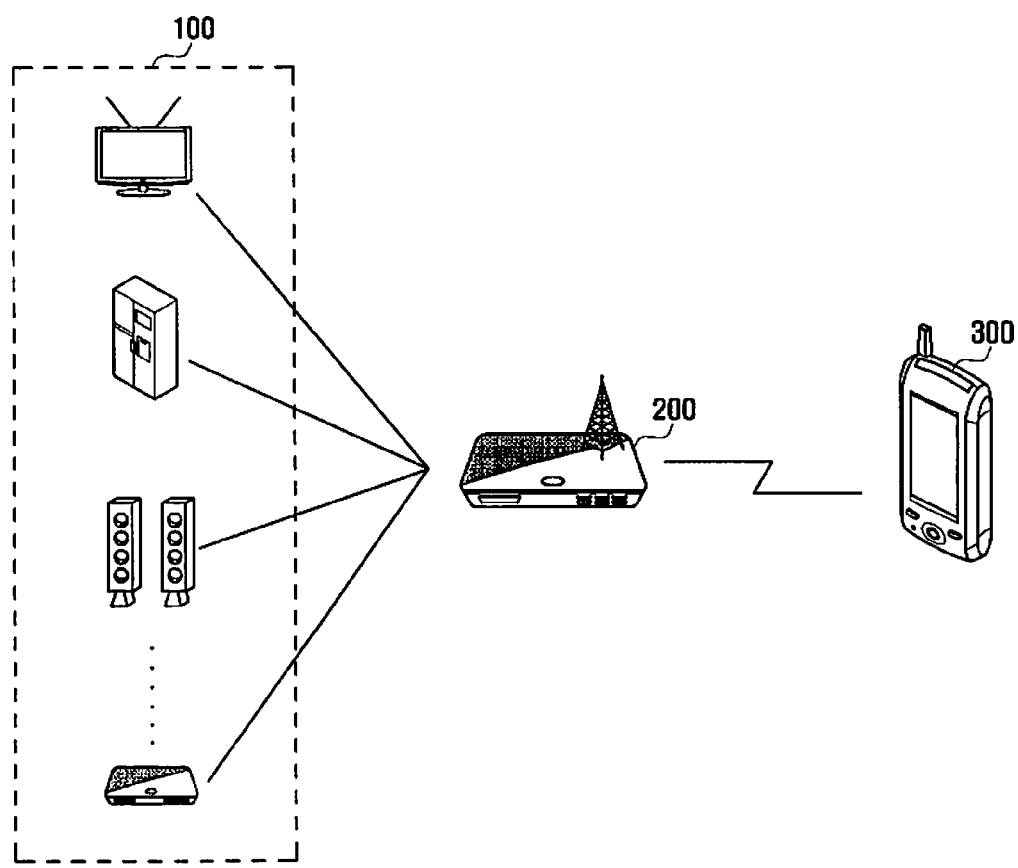
FIG. 1 is a diagram illustrating a configuration of a system for managing electronic devices, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention relate to a system and method that support a feedback function with respect to events that occur when a variety of electronic devices forming a network in a certain area (e.g., a home network, or an office network) operate, and thus, manage the electronic devices. When events occur while electronic devices operate, the system and method can determine a target electronic device to which an event message, indicating that the events have occurred, is transmitted. This determination is based on a variety of situations such as, for example, a type of event, a target user, a location of a target user, a type of electronic device that a target user uses, and a state of a target electronic device. A target device includes one or more pieces of user equipment used by corresponding target users and other devices that the target user uses. The event message is transmitted to a determined target device. A feedback function is executed, with respect to an optimal user who receives an event according to the operation of an electronic device, via an optimal notification mode.

In the following description, a network refers to a network environment where a variety of electronic devices are connected, based on Internet Protocol (IP), to a management apparatus, and are integrally managed thereby. That is, the network environment includes a number of electronic devices that are connected to each other via a network in a certain area (e.g., a house, an office, a hospital, a factory, etc.). The system according to the invention includes a number of electronic devices, a management apparatus, and a piece of user equipment.

The user equipment receives event messages from a management apparatus and forwards the event messages to one or more target users according to the user's selection. If a target user receives an event message but has difficulty processing the corresponding event that occurred in an electronic device, the target user can select more proper user of the other users and forward the event message thereto, thereby rapidly processing events that occurred in electronic devices.

The following description provides a management apparatus and a piece of user equipment in a configuration of the system, and methods for controlling the operations, in accordance with the accompanying drawings. It should be understood that the present invention is not limited to the following embodiments. As described herein, there may be many modifications from the embodiments of the present invention.

FIG. 1 is a diagram illustrating a configuration of a system for managing electronic devices, according to an embodiment of the invention.

Referring to FIG. 1, the electronic device managing system includes a number of electronic devices 100, a management apparatus 200, and a user equipment 300.

The electronic devices 100 include, for example, home appliances used in homes, office appliances used in offices, medical devices used in hospitals, and industrial devices used in factories. Examples of the electronic devices include TV sets, refrigerators, washing machines, computers (e.g., laptop computers and desktop computers), electric fans, air-conditioners, Digital Versatile Disc (DVD) players, audio players, external loudspeakers, game devices, steam boilers, boiler controllers, light controllers, microwave ovens, gas stoves, Digital Signage (DS), Large Format Displays (LFDs), digital cameras, electric cleaners, security devices (e.g., Closed-Circuit Television (CCTV)), and projectors. The electronic devices 100 may be arranged in a range of sectors, such as, for example, a home, an office, a hospital, and a factory, according to the features of the electronic devices 100. The electronic devices 100 are connected to the management apparatus 200 via a wireless or wired interface. In an embodiment of the present invention, the electronic devices 100 are connected to the management apparatus 200 via an IP-based wired interface. The electronic devices 100 provide device information to the management apparatus 200 according to requests, and perform operations according to the control of the management apparatus 200.

The electronic devices 100 create event messages according to their operations, and transmit the event messages to the management apparatus 200. For example, if a washing machine has completed its washing cycle, it creates a message corresponding to a washing cycle completion (i.e., a washing cycle completion event), and transmits the message to the management apparatus 200. If an air-conditioner requires a clean filter, the air-conditioner creates a message corresponding to a request for the replacement of the filter (i.e., a filter replacement event), and transmits the message to the management apparatus 200. If a refrigerator is turned off by a malfunction, the refrigerator creates a message reporting that the refrigerator is turned off (i.e., an electric-power break-down event), and transmits the message to the management apparatus 200. The conditions of the presence of events in the electronic devices 100 may be determined according to when the electronic devices 100 are manufactured or may be defined according to user settings. The electronic devices 100 receive event messages from the management apparatus 200, and display state information on screen interfaces of electronic devices where the events occurred, according to the received event messages.

The management apparatus 200 controls the operation of the electronic devices 100. The management apparatus 200 identifies events that occur in the electronic devices 100 and creates corresponding messages. The management apparatus 200 determines one or more target devices that will receive the created event messages (e.g., one or more pieces of user equipment of target users and/or one or more devices other than the user equipment), and transmits the event messages to the determined target device(s).

The management apparatus 200 receives messages reporting that events have occurred, from one or more electronic devices 100. The management apparatus 200 analyzes the received event notification messages, determines a target device to detect the presence of the events of a corresponding electronic device, and creates the event message. The management apparatus 200 transmits the created event message to the determined target device. In an embodiment of the invention, the management apparatus 200 determines a target device, considering a variety of factors, such as, for example, a type of electronic device that has transmitted an event notification message, a type of event, a location of a target user, and a state of a target electronic device. The target device includes one or more pieces of user equipment of target users and/or one or more electronic devices. Determining target devices by the management apparatus 200 includes determining an optimal user to which state information should be fed back according to the presence of events in the electronic devices 100, and determining an optimal device for feeding back to the determined user.

The management apparatus 200 may check electronic devices that are currently operating without an event notification message transmitted from the electronic devices 100, indentify the events that occurred, create the corresponding event messages, and transmit them thereto. For example, the management apparatus 200 checks electronic devices that are currently operating and identifies whether the events (e.g., the operation completion of corresponding electronic devices, the detection of errors, the detection of an electric power outage, etc.) occur. If the management apparatus 200 ascertains that an event has occurred, it determines a target device to which the event is fed back, creates the event message, and transmits the event message to the determined target device. The operation of and the control method for the management apparatus 200 are described in greater detail below.

The user equipment 300 can control the electronic devices 100, respectively, in a wireless interface mode. For example, the user equipment 300 may serve as a remote controller in order to remotely control the electronic devices 100, respectively. The user equipment 300 is connected to the management apparatus 200, via a wireless interface, and controls the electronic devices 100 respectively or in a group, via the management apparatus 200. The wireless interface supported by the user equipment 300 may employ short-range communication protocols, such as, for example, Radio Frequency Identification (RFID), Bluetooth, Near Field Communication (NFC), Infrared Data Association (IrDA), and Zigbee. Alternatively, the user equipment 300 may also employ an IP-based wireless interface (e.g., an interface supporting a Wi-Fi communication standard) or a mobile-communication based wireless interface (e.g., an interface for supporting a 3G or 4G communication standard), in order to support the communication with the management apparatus 200.

The user equipment 300 receives event messages from the management apparatus 200, and displays them on a screen interface. The user equipment 300 may also provide a user interface in order to support a function for forwarding received event messages. The user interface supported by the user equipment 300 is described in greater detail below. The operation of the user equipment 300 will also be described in greater detail below.

As described above, the electronic device managing system can feed back state information regarding one or more electronic devices in a certain area, where events occurred, to an optimal user, via an optimal target device, via the management apparatus 200 connected to a number of electronic devices 100.

Figure 2:
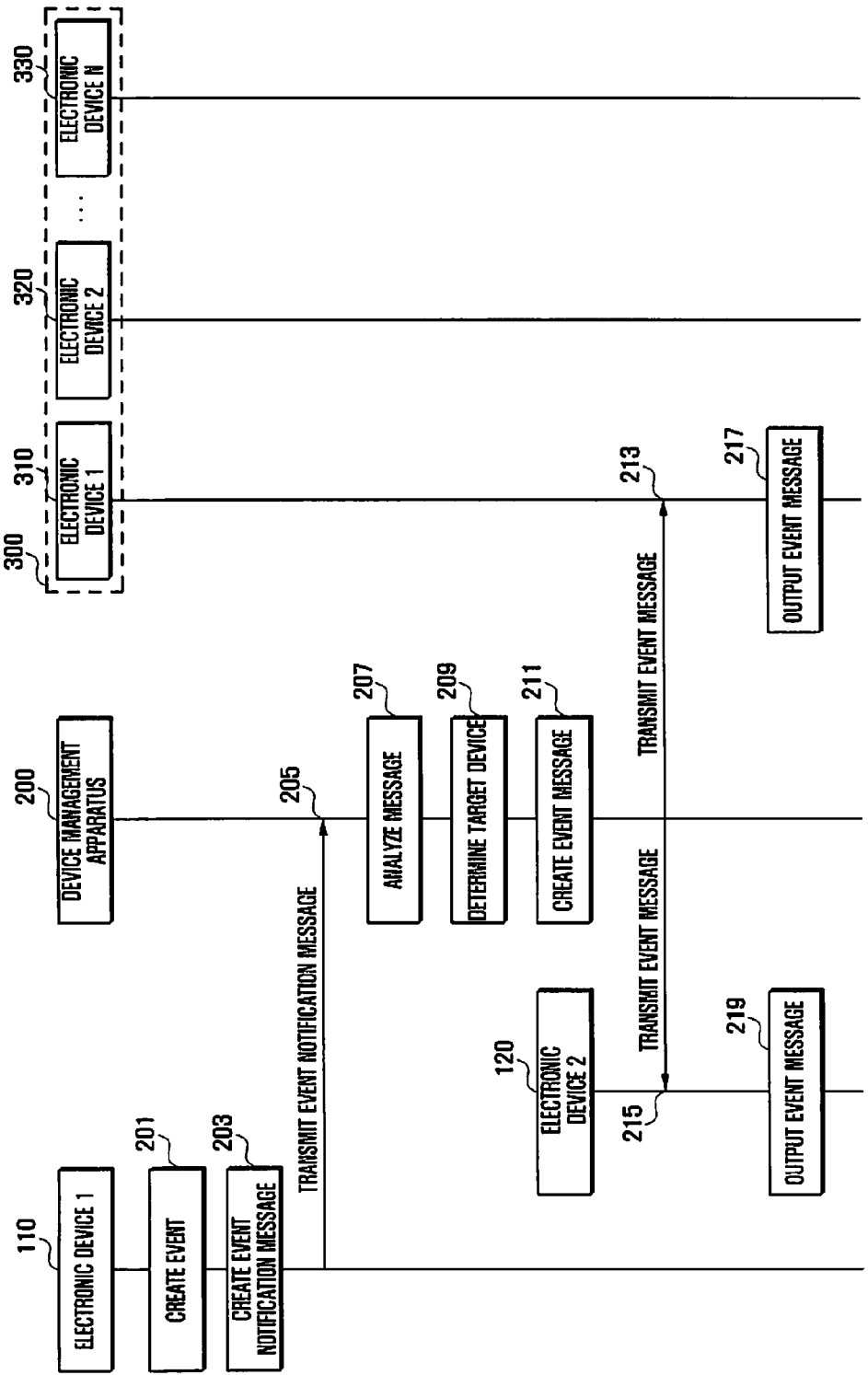
FIG. 2 is a flowchart illustrating a method for transmitting messages according to events that occurred in electronic devices, according to an embodiment of the present invention.

FIG. 2 is a flowchart illustrating a method for transmitting messages according to events that occurred in electronic devices, according to an embodiment of the present invention.

Referring to FIG. 2, an electronic device 110 detects an event that occurred, in step 201. For example, if the electronic device 110 is a washing machine, it detects an event corresponding to a washing cycle completion (i.e., a washing cycle completion event). If the electronic device 110 is an air-conditioner, it detects an event corresponding to a request for the replacement of the filter (i.e., a filter replacement event). If the electronic device 110 is a refrigerator, it detects an event corresponding to an electric power outage (i.e., an electric-power break-down event). It should be understood that the invention is not limited by the types of events listed above. There are a variety of events that may occur in the electronic devices.

When the electronic device 110 detects the presence of an event at step 201, it creates a message reporting the presence of the event (i.e., an event notification message), in step 203. For example, if the electronic device 110 is a washing machine, it creates an event notification message for reporting that washing cycle has been completed. If the electronic device 110 is an air-conditioner, it creates an event notification message for reporting that the replacement of the filter is required. If the electronic device 110 is a refrigerator, it creates an event notification message for reporting a breakdown according to an electric power outage. The event notification message includes an identifier, indicating that the event notification message reports the presence of the event that occurred in the electronic device 110, in a header field, and the state information (e.g., washing cycle completion, filter cleaning, breakdown, etc.) regarding the event that occurred in the electronic device, in a data field.

After creating the event notification message at step 203, the electronic device 110 transmits the event notification message to the management apparatus 200, in a wireless or wired mode, in step 205.

The management apparatus 200 analyzes the received event notification message, in step 207, by identifying the type of electronic device transmitting the message and determining whether the received message corresponds to the event notification message. The event notification message is identified by analyzing the identifier in the header field.

When identifying the event notification message at step 207, the management apparatus 200 determines a target device to which the event that occurred in the electronic device 110 is to be reported, in step 209. In an embodiment of the present invention, the target device includes one or more pieces of user equipment of primary users who use the electronic device 110 (i.e., target users) or one or more electronic devices. The management apparatus 200 determines one or more target devices for reporting the presence of events, considering a variety of situations, such as, for example, the type of event (e.g., the urgency of the event that occurred), a target user (e.g., one or more primary users who use electronic devices where the event occurred, such as the electronic device 110), a location of a target user, a type of electronic device that a target user uses, and a state of a target electronic device. In an embodiment of the present invention, as shown in FIG. 2, it is assumed that the target device is user equipment 310, and an electronic device 120, selected from a number of pieces of user equipment 310, 320 and 330 and a number of electronic devices 100. The process of determining a target device by the management apparatus 200 is described in greater detail below.

After determining a target device at step 209, the management apparatus 200 creates an event message for reporting the event that occurred in the electronic device 110 via the target device, in step 211. The event message includes an identifier, indicating that the message serves to report the presence of the event that occurred in the electronic device 110, in the header field. The event message also includes information regarding the electronic device 110 where the event occurred and the state information for reporting the content of the event, in the data field. The state information may be input to the data field, by referring to a data field of the event notification message transmitted from the electronic device 110 or the content of the message (i.e., state information) in a preset mapping table (see Table 2). The data field may further include command codes for controlling the output of event messages.

After creating the event message at step 211, the management apparatus 200 transmits the event message to the determined target devices (e.g., the electronic device 120 and a piece of user equipment 310) respectively, in steps 213 and 215.

The electronic device 120 and the user equipment 310 output the received event message in a screen mode and/or in a voice mode, in steps 217 and 219. For example, if the electronic device 120 is a TV set, the electronic device 120 outputs the received event message on the screen and via a speaker simultaneously, or alternatively in one of the two modes, according to the command code. Likewise, if the electronic device 120 is an audio system, it can output the received event message in a voice mode. The user equipment 130 outputs the received event message on the screen as a default, and further optionally outputs the message in a voice mode In the following description of embodiments of the present invention, the process of determining a target device by the management apparatus 200 is described with reference to Table 1.

TABLE 1

| | Types of electronic devices | | |
|---|---|---|---|
| | Washing machine | Air-conditioner | Refrigerator |
| Content of Message | Washing cycle completion | Require filter cleaning | Electric power malfunction due to breakdown |
| Urgency | Low | Low | Low |
| Primary user of electronic device | User A | User A User B | User A User B |
| Location of primary user | Indoors | User A: outdoors User B: indoors | User A: outdoors User B: indoors |
| State of electronic device used by primary user | TV: ON User equipment: ON | TV: ON User equipment: ON | TV: ON User A's equipment: ON User B's equipment: ON |
| Result | Transmit the washing cycle completion message to TV and User A's equipment | Transmit the message for requiring the filter to be cleaned to User B's equipment | Transmit the refrigerator breakdown message to TV, User A's equipment, and User B's equipment |

As shown in Table 1, determining a target device is explained with reference to the electronic device 110 embodied as a washing machine, an air-conditioner or a refrigerator. If the electronic device 110 is set as a washing machine, it transmits an event notification message according to a washing cycle completion to the management apparatus 200. The management apparatus 200 identifies the type of electronic device (e.g., a washing machine) and detects the type of event (e.g., urgency) regarding the event that has occurred in the electronic device (e.g., a washing cycle completion event).

The types of events that may occur for the types of electronic devices may be preset in a mapping table in the management apparatus 200. When the management apparatus 200 identifies a washing machine via the received event notification message, it determines whether the type of event for the washing machine corresponds to a high urgency or low urgency by referring to the mapping table.

If the management apparatus 200 ascertains that the event that occurred in the electronic device corresponds to a low level of urgency, it identifies a target user who uses the washing machine as User A. Information regarding target users, according to the type of electronic device, may be preset in a mapping table, as shown below in Table 2.

TABLE 2

| Types of electronic devices | Content of event | Type of event | Target user | Electronic device in use |
|---|---|---|---|---|
| Washing machine | Washing cycle completion | Low | User A | TV, Device |
| Air-conditioner | Filter requires cleaning | Low | User A User B | User A: TV, Device |

TABLE 2-continued

| Types of electronic devices | Content of event | Type of event | Target user | Electronic device in use |
|---|---|---|---|---|
| Refrigerator | Breakdown | High | User A User B | User B: TV, Device User A: TV, Device User B: TV, Device |
| Gas stove | Gas leakage | Very High | User A | TV, Device |
| ... | ... | ... | ... | ... |

When the management apparatus 200 identifies a target user (e.g., User A) of the washing machine, it may also detect the location of the target user. For example, the management apparatus 200 determines whether the user equipment of User A exists in the network. Specifically, the management apparatus 200 determines whether User A's equipment exists in a certain area (e.g., a home) where the apparatus 200 and a number of electronic devices, including User A's equipment, form a network. The management apparatus 200 may detect a signal transmitted from User A's equipment. When detecting the location of User A's equipment, the management apparatus 200 can also identify whether User A's equipment is located inside the network (e.g., indoors) or outside the network (e.g., outdoors).

After detecting the location of a target user, the management apparatus 200 detects the other types of electronic devices that the target user uses, which are referred to as target electronic devices. The target electronic devices include pieces of user equipment and a number of electronic devices 100, other than the washing machine, which are used by the target user. For example, the management apparatus 200 can detect an electronic device used by User A, as a target user, who uses the washing machine, by referring to the mapping table of Table 2. The management apparatus 200 can also check the state of the other electronic devices A (e.g., user equipment and TV) used by User A. Specifically, the management apparatus 200 can check whether the other electronic devices are turned on/off.

After analyzing the electronic devices as described above, the management apparatus 200 can determine the final target device and the final target user in order to report the events, based on an order of priority for a given situation. In an embodiment of the present invention, the priority has an order, e.g., a type of event (e.g., urgency)>location of a target user (indoors>outdoors)>a target electronic device used by a target user indoors and the state (On>Off). For example, if the management apparatus 200 ascertains that: the event that occurred in the washing machine has a low level of urgency; User A is indoors; and the types of electronic devices that User A uses are a piece of user equipment and a TV, it can determine that the user equipment and that TV are final target devices. Both the user equipment and the TV can be set as final target devices according to the user's settings. Alternatively, the user equipment or the TV can be set as a final target device according to the order of priority.

When determining a target device, the management apparatus 200 can also create an event message for reporting that a washing cycle completion event has occurred in the washing machine. The event message includes the state information, reporting that the washing machine has completed its washing cycle, in the data field. The state information may be input to the data field by referring to a data field of the event notification message transmitted from the washing machine or the content of message (i.e., state information) in a mapping table. The event messages may include an identifier, indicating that the transmitted message serves to report the presence of the event that occurred in the electronic device, in the header field. The data field may further include command codes for controlling the output of event messages.

The management apparatus 200 transmits the created event message to the finally determined target device (e.g., TV and User A's equipment). The target device (e.g., TV and User A's equipment) outputs the received event message, thereby notifying User A of the event that occurred in the washing machine. Outputting the event message is performed in a video mode via the screen and/or an audio mode via a speaker, according to type of electronic device that received the event message.

As described in Table 1, if the electronic device 110 is set as an air-conditioner, it transmits an event notification message, for the event requiring a clean filter, to the management apparatus 200. The management apparatus 200 identifies the type of electronic device (e.g., an air-conditioner) via the received message. The management apparatus 200 detects the type of event (e.g., urgency) regarding the event that occurred in the electronic device, by referring to the mapping table.

If the management apparatus 200 ascertains that the event that occurred in the electronic device corresponds to a low level of urgency, it identifies target users who use the air-conditioner as User A and User B. Information regarding target users based on the type of electronic device may be acquired by referring to the mapping table.

When the management apparatus 200 identifies target users of the air-conditioner, it may also detect the locations of the target users. The management apparatus 200 can detect the locations of the target users (e.g., User A and User B) using the same method as described with respect to the washing machine event. After detecting the locations of the target users (User A and User B), the management apparatus 200 detects types of other electronic devices that the target users use. The other electronic devices include pieces of user equipment and a number of electronic devices 100, other than the air-conditioner, which are used by the target users. For example, the management apparatus 200 can detect electronic devices used by User A and User B, as target users, who use the air-conditioner, by referring to the mapping table of Table 2. The management apparatus 200 can also check the state of the other electronic devices (e.g., user equipment and TV) used by User B indoors. If User A is outdoors, since User A cannot use electronic devices other than the user equipment, the management apparatus 200 determines whether the other electronic devices used by User B indoors are turned on/off.

After analyzing the electronic devices as described above, the management apparatus 200 can determine the final target device and the final target user in order to report the event according to the order of priority for the given situation. In an embodiment of the present invention, the priority has an order, e.g., a type of event (e.g., urgency)>location of a target user (indoors>outdoors)>an electronic device used by a target user indoors and the state (On>Off). For example, if the management apparatus 200 ascertains that the event that occurred in the air-conditioner has a low level of urgency, it can identify the primary users, i.e., User A and User B. If the management apparatus 200 detects the locations of User A and User B, and identifies that User A is outdoors and User B is indoors, it can determine User B as a final target user according to the order of priority. The management apparatus 200 identifies electronic devices used by the final target user and checks whether they are turned on/off. For example, the management apparatus 200 detects the states of a TV and a piece of user equipment, used by User B indoors, and ascertains that the TV is turned off and the user equipment is turned on. Thus, the management apparatus 200 can determine pieces of user equipment from among the other electronic devices, which are used by User B and turned on, as final target devices.

When determining a target device, the management apparatus 200 can also create an event message for reporting that an event requiring a clean filter has occurred in the air-conditioner. The event message includes the state information, reporting that the air-conditioner requires the clean filter, in the data field. The state information may be input to the data field, by referring to a data field of the event notification message transmitted from the air-conditioner or the content of message (i.e., state information) in a mapping table. The event messages may include an identifier, indicating that the transmitted message serves to report the event that occurred in the electronic device, in the header field. The data field may further include command codes for controlling the output of event messages.

The management apparatus 200 transmits the created event message to the finally determined target device (e.g., User B's equipment). The target device (e.g., User B's equipment) outputs the received event message, thereby notifying User B of the presence of the event that has occurred in the air-conditioner.

As described in Table 1, if the electronic device 110 is a refrigerator, it may transmit an event notification message, based on an electric power outage due to a breakdown to the management apparatus 200. The management apparatus 200 identifies the type of electronic device (e.g., a refrigerator) via the received message. The management apparatus 200 detects the type of event (e.g., urgency) regarding the event that occurred in the electronic device (e.g., a refrigerator), by referring to the mapping table.

If the management apparatus 200 ascertains that the event that occurred in the electronic device corresponds to a high level of urgency, it identifies all target users who can transmit event messages (e.g., User A and User B). Information regarding target users, according the types of electronic device, may be acquired by referring to the mapping table.

When the management apparatus 200 identifies target users of the refrigerator, it may also detect the locations of the target users. The management apparatus 200 detects the locations of the target users (e.g., User A and User B) using the same method as described above with respect to the washing machine. After detecting the locations of the target users (User A and User B), the management apparatus 200 detects the other types of electronic devices that the target users use. The other electronic devices include pieces of user equipment and a number of electronic devices 100 other than the refrigerator, which are used by the target users. For example, the management apparatus 200 can detect electronic devices used by User A and User B as target users, who use the refrigerator, by referring to the mapping table as described in Table 2. The management apparatus 200 can also check the state of the other electronic devices (e.g., user equipment and TV) used by User B indoors. If User A is outdoors, since User A cannot use the other electronic devices other than the user equipment, the management apparatus 200 determines whether the other electronic devices that are used indoors by User B are turned on/off.

After analyzing the electronic devices as described above, the management apparatus 200 can determine the final target device and the final target user in order to report the event. Since the management apparatus 200 ascertains that the type of the event that occurred in the electronic device corresponds to high urgency, it determines all users who were registered (e.g., User A and User B) as target users, and determines target devices according to whether they are indoors or outdoors. Specifically, when determining User A and User B as target users that transmit event messages, the management apparatus 200 determines the final target device by checking the states of the other electronic devices used indoors by User B. For example, as described in Table 1, the management apparatus 200 determines user equipment used outdoors by User A, user equipment used indoors by User B, and a TV used by User B, as the final target devices.

When determining target devices, the management apparatus 200 can also create an event message for reporting that an electric power outage event occurs in the refrigerator due to a breakdown. The event message includes state information, reporting that the electric power is cut off to the refrigerator due to the breakdown, in the data field. The state information may be input to the data field, by referring to a data field of the event notification message transmitted from the refrigerator or the content of message (i.e., state information) in a mapping table. The event messages may include an identifier, indicating that the transmitted message serves to report the presence of the event that occurred in the electronic device, in the header field. The data field may further include command codes for controlling the output of event messages.

The management apparatus 200 transmits the created event message to the finally determined target devices (e.g., User A's equipment, User B's equipment, and the TV used by User B). The target devices (e.g., User A's equipment, User B's equipment, and the TV used by User B) output the received event messages, thereby notifying User A and User B of the presence of the urgent event that occurred in the refrigerator.

Figure 3:
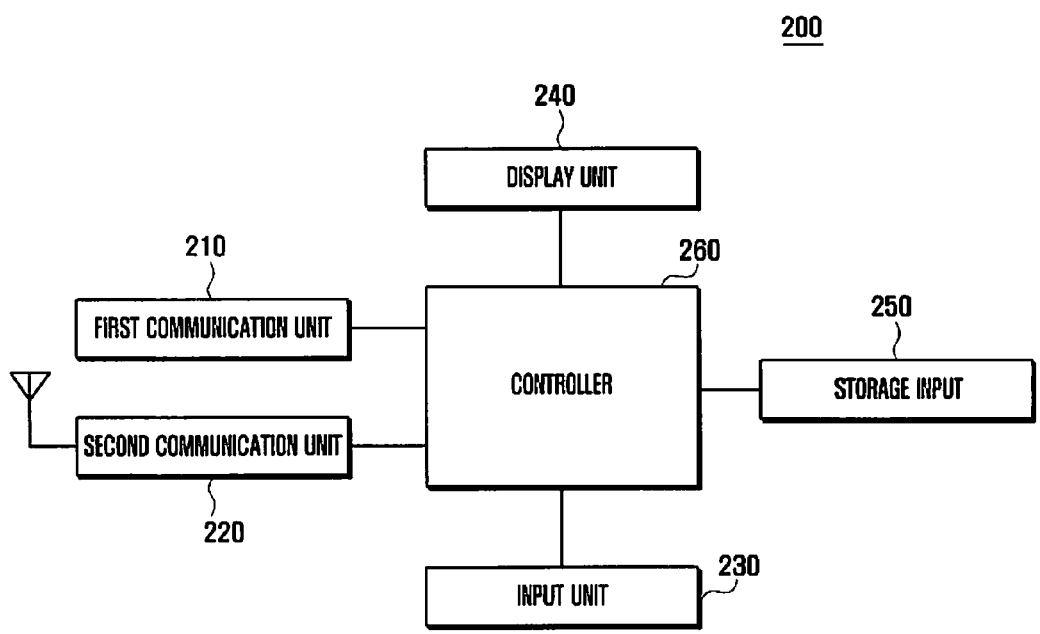
FIG. 3 is a schematic block diagram illustrating a management apparatus, according to an embodiment of the present invention.

FIG. 3 illustrates a schematic block diagram of a management apparatus, according to an embodiment of the present invention.

Referring to FIG. 3, the management apparatus 200 includes a first communication unit 210, a second communication unit 220, an input unit 230, a display unit 240, a storage input 250 and a controller 260. Although not shown in FIG. 3, the management apparatus 200 may further include, for example, an audio processing unit with a microphone and a speaker, and a battery supplying electric power to the components.

The first communication unit 210 is connected to a number of electronic devices 100 via an IP-based wired interface, and communicates with the electronic devices 100. The first communication unit 210 receives event notification messages from the electronic devices 100 and transfers the event notification messages to the controller 260. The first communication unit 210 transmits event messages to the electronic devices 100 under the control of the controller 260. In another embodiment of the present invention, the management apparatus 200 may be connected to the electronic devices 100 via a wireless interface mode, and may not require the first communication unit 210. In that case, the management apparatus 200 uses the second communication unit 220 to wirelessly connect to the electronic devices 100.

The second communication unit 220 is connected to the user equipment 300 via a wireless interface mode, and communicates with the user equipment 300 via the wireless interface mode. For example, the second communication unit 220 transmits event messages to the user equipment 300 under the control of the controller 260. The second communication unit 220 may also be connected to the electronic devices 100 via a wireless interface mode, and communicate with the electronic devices 100 via the wireless interface mode. For example, the second communication unit 220 receives event notification messages from the electronic devices 100 and transfers the event notification messages to the controller 260. The second communication unit 220 transmits event messages to the electronic devices 100 under the control of the controller 260. The second communication unit 220 may be implemented with one or more short-range communication modules for supporting short-range communication, such as, for example, Bluetooth communication, Infrared communication, Radio Frequency Identification (RFID) communication, and Near Field Communication (NFC).

Although not shown in FIG. 3, the management apparatus 200 may further include an RF communication unit for supporting IP-based Internet communication services or mobile communication services. In that case, the RF communication unit performs data transmission via IP-based communication or mobile communication. It should be understood that the present invention is not limited to the embodiment with first 210 and second 220 communication units and an RF communication unit. For example, the management apparatus 200 may be equipped with various types of communication units in order to communicate with the electronic devices 100 and the user equipment 300.

The input unit 230 creates signals for operating the management apparatus 200. The signals may include, for example, a signal for controlling the supply of electric power to the management apparatus 200, signals for selecting one or more electronic devices, and signals for controlling the selected electronic devices. The signals are created according to a user's request. The signals created via the input unit 230 are transferred to the controller 260 and serve as commands for controlling the operations in the management apparatus 200. The input unit 230 may be implemented with one or more of a keyboard, a keypad, key buttons, and a mouse device. If the display unit 240 is implemented with a touch screen, the input unit 230 may be embodied as a touch map displayed on the touch screen.

The display unit 240 displays the operation states of the management apparatus 200 and the screens related to the operations. For example, the display unit 240 displays a list of electronic devices 100 controlled by the management apparatus 200. The display unit 240 may also display the electronic devices 100 that are enabled and disabled. The display unit 240 may also display, for example, an interface screen allowing the user to control one or more electronic devices, a screen showing information regarding electronic devices where events occur, and a screen showing the content of events (state information) that occurred in electronic devices. The display unit 240 may be implemented with, for example, a Liquid Crystal Display (LCD), Light Emitting Diodes (LEDs), Organic Light Emitting Diodes (OLEDs), or Active Matrix Organic Light Emitting Diodes (AMOLEDs). The display unit 240 may also be implemented with a touch-based interface. For example, the display unit 240 may be implemented with a touch screen. In that case, the touch screen senses user touches and transfers the corresponding signals to the controller 260.

The storage input 250 stores data and application programs executed in the management apparatus 200. The storage input 250 is implemented with one or more memory devices. In an embodiment of the present invention, the storage input 250 may be embodied as, for example, a Read Only Memory (ROM), a flash memory, a Random Access Memory (RAM), internal hard disks, external hard disks, or external storage devices. The storage input 250 stores an operating system for controlling the management apparatus 200. The storage input 250 temporarily or permanently stores an application program for receiving signals corresponding to events that have occurred in electronic devices 100 and for managing or controlling the corresponding operations, and data related to the application program. The storage input 250 temporarily or permanently stores an application program for determining target devices in order to feed back events that have occurred in electronic devices, and data related to the application program. The storage input 250 temporarily or permanently stores an application program for transmitting event messages to the determined target devices, and data related to the application program. The storage input 250 can also store information related to the function for feeding back events that have occurred in electronic devices 100, for example, mapping tables, and information regarding the order of priority to determine target devices.

The controller 260 controls the entire operation of the management apparatus 200. The controller 260 controls operations for feeding back events that have occurred in the electronic devices 100 to a user. For example, the controller 260 controls the operations of the electronic devices 100, and identifies target electronic devices where events occur. The controller 260 can determine a target device for reporting the presence of events, considering a variety of situations, such as, for example, types of events that have occurred in the target electronic devices, a target user, a location of a target user, a type of target electronic device, and a state of target electronic device. The controller 260 creates an event message to inform the user that an event has occurred in an electronic device and transmits the event message to the determined target device.

A detailed description of the controller 260 is provided in the following description with reference to the accompanying drawings.

Figure 4:
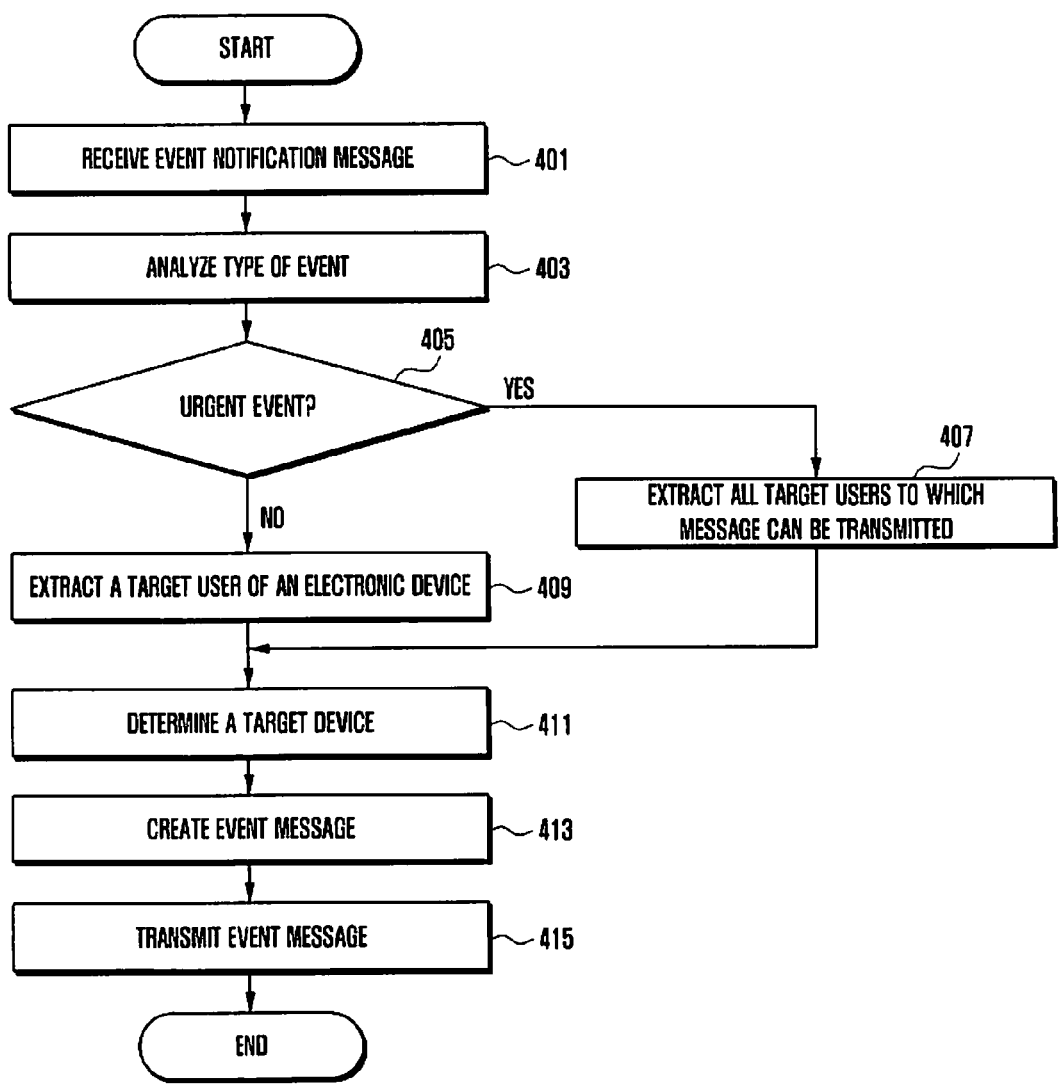
FIG. 4 is a flowchart illustrating a method for feeding back, to a user, signals corresponding to events that occurred in electronic devices, in a management apparatus, according to an embodiment of the present invention.

FIG. 4 is a flow chart illustrating a method for feeding back, to a user, signals corresponding to events that occurred in electronic devices, in the management apparatus 200, according to an embodiment of the present invention.

Referring to FIG. 4, the controller 260 receives an event notification message from a specific one of the electronic devices, in step 401. The controller 260 analyzes the event notification message to determine a type of the event corresponding to the received event notification message, in step 403. For example, the controller 260 analyzes the received event notification message and identifies a type of the specific electronic device that transmitted the event notification message.

The controller 260 determines whether the type of event corresponds to an urgent event, in step 405, by referring to the preset mapping table described above, for example.

If the controller 260 ascertains that the type of event has a low level of urgency, it extracts a target user who uses the specific electronic device where the event has occurred, in step 409. If the controller 260 ascertains that the type of event has a high level of urgency, it extracts all target users who can perform transmission of a message with respect to the event (i.e., who can perform a feedback operation with respect to the event), in step 407, by referring to the mapping table described above, for example.

After extracting target users at steps 407 and 409, the controller 260 determines target devices based on the extracted target users, in step 411. For example, the controller 260 may determine one or more target devices to report the presence of event, considering a number of situations including, for example, a location of a target user, a type of target electronic device used by the target user, and a state of the target electronic device. A detailed description of determining target devices by the controller 260 is provided below with reference to FIG. 5.

After determining the target devices at step 411, the controller 260 creates an event message reporting the event that occurred in the electronic device, via the target devices, in step 413. The controller 260 transmits the created event message to the determined one or more target devices, in step 415.

Although not shown in FIG. 4, the controller 260 may include a type of event, indicating the urgency of the event that occurred in the electronic devices, in the data field of the event message to be transmitted to user equipment used by a target user. If the controller 260 does not receive a reply message as to whether user equipment of the target user has received the event message, from the user equipment, it may process the transmission of an event message according to a re-determination of a target device. Alternatively, if the controller 260 has not received a reply message as to whether user equipment of the target user has received the event message, from the user equipment, it may re-transmit the event message. Alternatively, if the controller 260 receives a message indicating that user equipment of the target user has not checked the event message (i.e., a not-confirmed message), from the user equipment, it may re-determine a target device via the processes described above, and transmit the event message to the re-determined target device.

Figure 5:
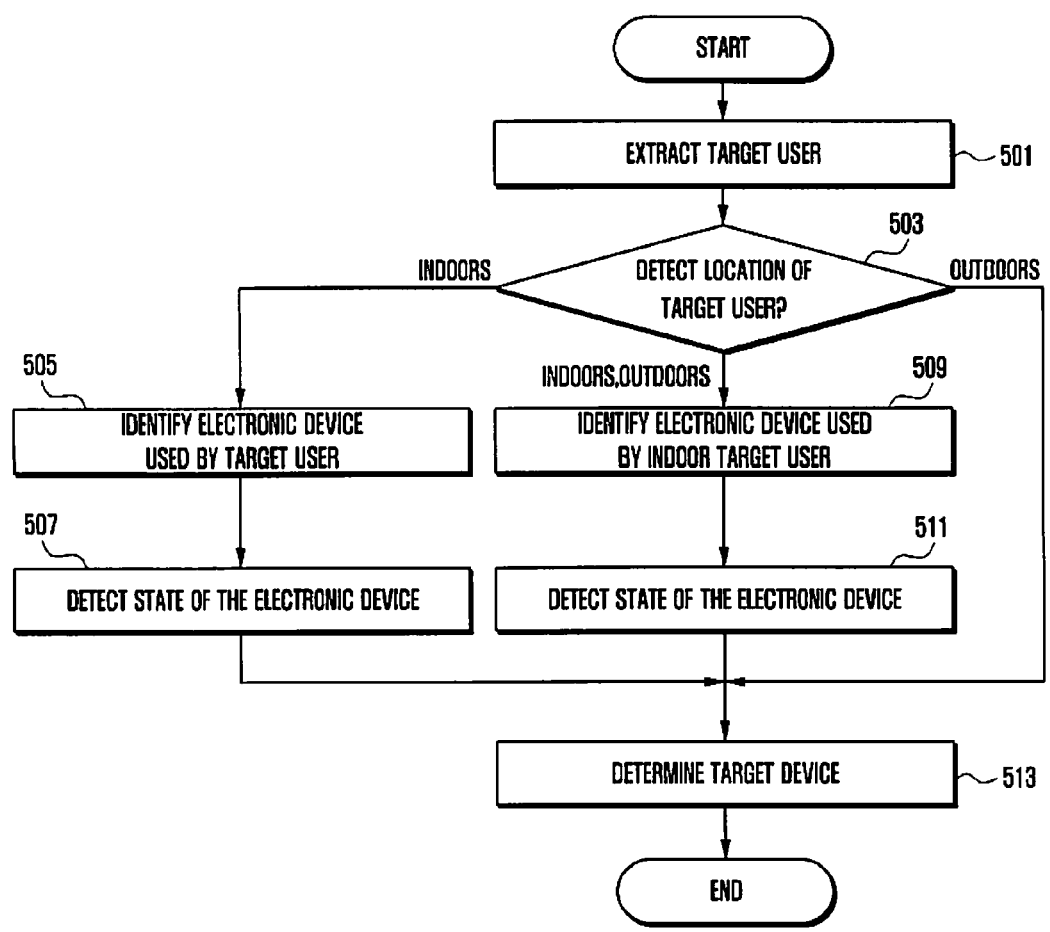
FIG. 5 is a flowchart illustrating a method for determining a target device to which an event message is transmitted, in a management apparatus, according to an embodiment of the present invention.

FIG. 5 is a flow chart illustrating a method for determining a target device to which an event message is transmitted, in a management apparatus, according to an embodiment of the present invention.

Referring to FIG. 5, the controller 260 extracts a target user, in step 501. For example, as described in FIG. 4, the controller 260 extracts a target user based on the urgency indicated by a type of event.

After extracting a target user, the controller 260 detects the location of the extracted target user, in step 503. For example, as described above with reference to Tables 1 and 2, the controller 260 searches for a target device of a target user and determines whether the target user is indoors or outdoors, or whether a number of target users are indoors or outdoors.

If the controller 260 ascertains that the target user is indoors, it identifies the other electronic devices that the target user uses, in step 505. In addition, if the controller 260 ascertains that all the extracted target users are indoors, it can identify electronic devices used by the respective target users. The controller 260 detects the states of the identified electronic devices, in step 507. For example, the controller 260 detects whether the identified electronic devices are turned on or off. The controller 260 identifies one or more target devices, based on the pieces of user equipment that one or more indoor target users use and one or more electronic devices that are turned on, in step 513. For example, when a number of target users are indoors, the controller 260 determines, as target devices, pieces of user equipment used by the target users or user equipment used by a specific target user with the highest order of priority. The controller 260 then determines, as the final target device, all the electronic devices used by the target users or a specific electronic device with the highest order of priority, (e.g., an electronic device commonly used by the target users). Although not shown in FIG. 5, the determination of the final target device may be performed in a different process, according to a type of event (i.e., urgency). For example, if an event has a low level of urgency, the controller 260 may determine that the electronic devices used by target users that are indoors are target devices. If an event has a high level of urgency, the controller 260 may determine that the electronic devices used by target users that are indoors and pieces of user equipment used by target users that are outdoors, are target devices.

If the controller 260 ascertains that target users are indoors and outdoors at step 503, it can identify the other electronic devices used by a target user that is indoors (e.g., a first target user), in step 509. Specifically, if the extracted target users are indoors and outdoors, the controller 260 can identify the other electronic devices used by the target user that is indoors. The controller 260 detects the states of the identified electronic devices, in step 511. For example, the controller 260 detects whether the identified electronic devices are turned on or off. The controller 260 can determine a target device, based on pieces of user equipment, used by a target user that is indoors (first target user) and a target user that is outdoors (second target user), and electronic devices that are used by the first target user and turned on. The controller 260 can determine, as a final target device, user equipment used by a first target user and the other electronic device that is used by the first target user and turned on. Although not shown in FIG. 5, the determination of the final target device may be performed in a different process, according to a type of event (i.e., urgency). For example, if an event has a low level of urgency, the controller 260 may determine that the electronic devices used by target users that are indoors are target devices. If an event has a high level of urgency, the controller 260 may determine that the electronic devices used by target users that are indoors and pieces of user equipment used by target users that are outdoors, are target devices.

If the controller 260 ascertains that the target user is outdoors, i.e., there are no target users indoors, at step 503, the controller 260 determines the user equipment used by the target user as a final target device, in step 513.

Figure 6:
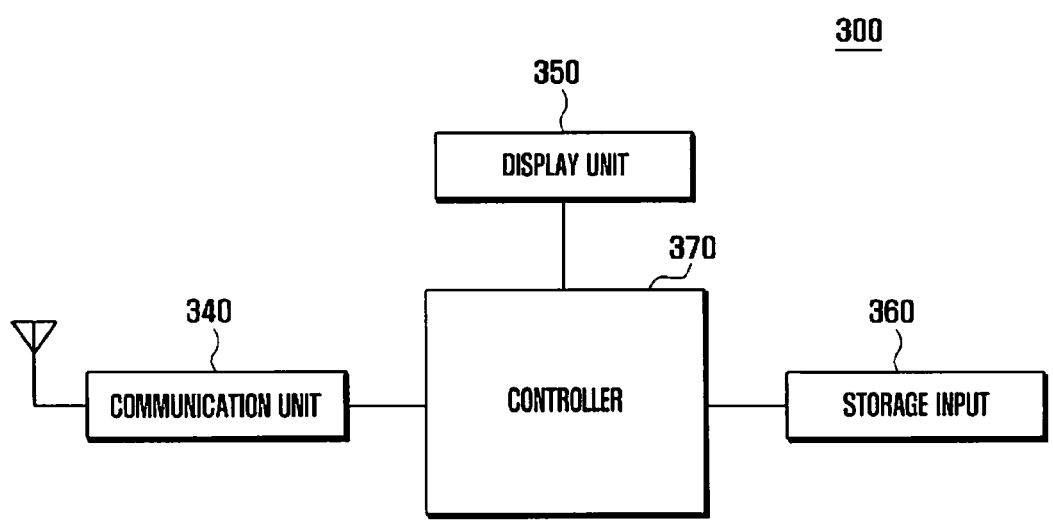
FIG. 6 is a schematic block diagram illustrating user equipment, according to an embodiment of the present invention.

FIG. 6 is a schematic block diagram illustrating user equipment 300, according to an embodiment of the present invention.

Referring to FIG. 6, the user equipment 300 includes a communication unit 340, a display unit 350, a storage input 360, and a controller 370. Although not shown in FIG. 6, it should be understood that the user equipment 300 may further include, for example, an audio processing unit with a microphone and a speaker, a digital broadcasting module for receiving digital broadcasts (e.g., mobile broadcasting, such as, Digital Multimedia Broadcasting (DMB), and Digital Video Broadcasting (DVB)), a camera module for acquiring still images or videos, an input unit with mechanical keys, a touch-based pad, and a battery supplying electric power to the components.

The communication unit 340 is connected to the electronic devices 100 via a wireless communication mode, and communicates with the electronic devices via the wireless communication mode. The communication unit 340 is implemented with one or more communication modules for supporting wireless communication, such as, for example, Bluetooth communication, Infrared communication, RFID communication, Zigbee communication, NFC, and Wi-Fi communication. The communication unit 340 may also be wirelessly connected to the management apparatus 200 via the Internet or a mobile communication network. In that case, the communication unit 340 may include one or more communication modules for supporting IP-based Internet communication or mobile communication. It should be understood that the user equipment 300 is not limited to an embodiment where the communication unit 340 is implemented to include the communication modules or communication modes listed above. Specifically, the user equipment 300 may include various types of communication units to communicate with the electronic devices 100 and the management apparatus 200. The communication unit 340 receives event messages from the management apparatus 200, and transfers the event messages to the controller 370.

The display unit 350 displays the operation states of the user equipment 300 and the screens related to the operations. For example, the display unit 350 displays a home screen of the user equipment 300, or screens according to the execution of application programs. The display unit 350 also displays a screen in order to forward event messages transmitted from the management apparatus 200. The display unit 350 displays a user interface screen that includes an area showing content of an event (state information), and an area allowing the user to select one or more items to be forwarded. The configuration of the user interface screen is described in greater detail below. The display unit 350 may be implemented with, for example, an LCD, LEDs, OLEDs, or AMOLEDs. The display unit 350 may also be implemented with a touch-based interface. For example, the display unit 350 may be implemented with a touch screen. In that case, the touch screen senses user touches and transfers the corresponding signals to the controller 370.

The storage input 360 stores data and application programs executed in the user equipment 300. The storage input 360 is implemented with one or more memory devices. In an embodiment of the invention, the storage input 360 is embodied as, for example, a ROM, a flash memory, a RAM, internal hard disks, external hard disks, and/or external storage devices. The storage input 360 stores an operating system for controlling the user equipment 300. The storage input 360 temporarily or permanently stores an application program for receiving and outputting event messages, and data related to the application program. The storage input 360 temporarily or permanently stores an application program for forwarding received event messages, and the data related to the application program. The storage input 360 also stores information to execute the event message forwarding function, which includes, for example, a receiver's information, and a waiting period of time to check a received event message.

The controller 370 controls the entire operation of the user equipment 300. The controller 370 controls the forwarding function of event messages that are transmitted from the management apparatus 200. For example, the controller 370 receives event messages from the management apparatus 200 and outputs the event messages on the screen interface. If the controller 370 ascertains that the user has checked a received event message, it creates the reply message and transmits the reply message to the management apparatus 200. The controller 370 also provides a user interface to forward received messages, which is described in greater detail below. The controller 370 identifies a target user that the user has selected via the user interface for forwarding event messages, and forwards the event message based on information regarding the identified target user. If the controller 370 ascertains that the user did not check a received event message within a preset waiting period of time, it re-informs the user that the event message has received or performs an automatic forward function. A detailed description of the controller 370 is provided below with reference to the accompanying drawings.

The user equipment 300, according to an embodiment of the present invention, includes all information communication devices, multimedia devices, and their applications, which are operated according to communication protocols corresponding to various types of communication systems. For example, the user equipment 300 can be embodied as a mobile communication terminal, a tablet personal computer, a smartphone, a Portable Multimedia Player (PMP), a media player, a mobile game player, a laptop computer, or a Personal Digital Assistant (PDA).

Figure 7:
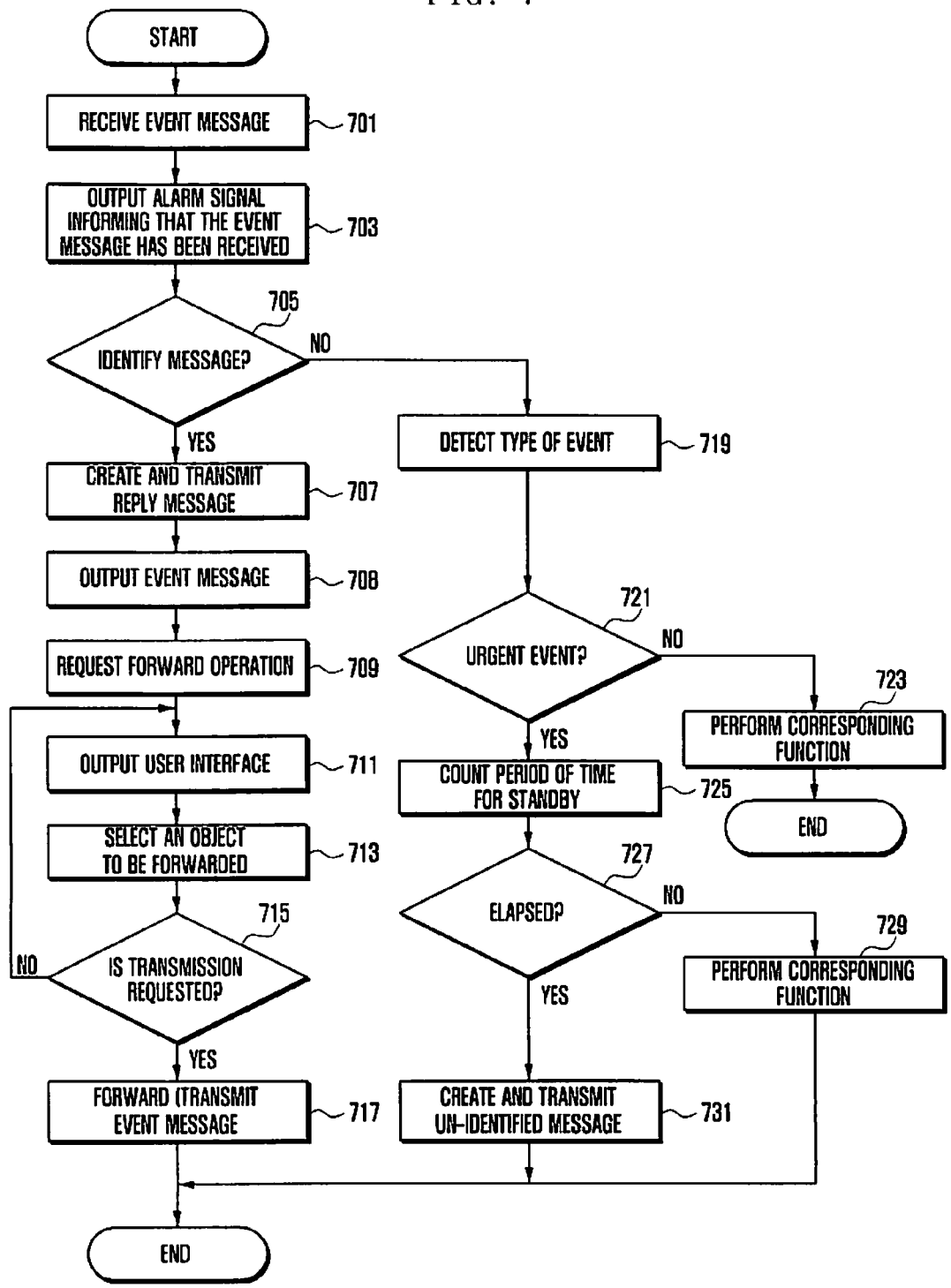
FIG. 7 is a flow chart illustrating a method for forwarding messages to user equipment, according to an embodiment of the present invention.
Figure 8:
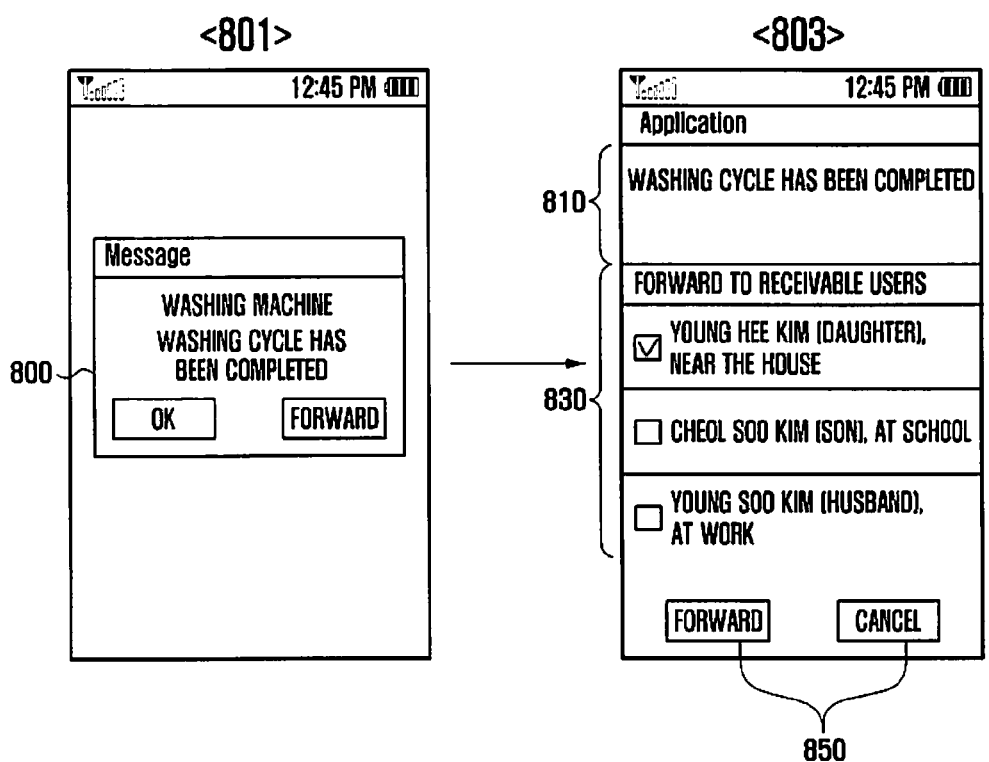
FIG. 8 illustrates screens showing user interfaces for forwarding messages to user equipment, according to an embodiment of the present invention.

FIG. 7 is a flow chart illustrating a method for forwarding messages in the user equipment 300, according to an embodiment of the present invention. FIG. 8 illustrates screens showing user interfaces for forwarding messages in the user equipment 300, according to an embodiment of the present invention.

Referring to FIGS. 7 and 8, the controller 370 receives an event message from the management apparatus 200, in step 701. The controller 370 outputs an alarm signal informing that the event message has been received, in step 703. The controller 370 determines whether the user has checked the received event message, in step 705. When the controller 370 receives an event message, it may output an alarm signal informing that the event messages has been received via one or more of a variety of modes, such as, for example, a vibration mode, an audio output mode, and a screen display mode.

If the controller 370 ascertains that the user has checked the received event message, it creates a reply message informing that the user checked the received event message, and transmits the reply message to the management apparatus 200, in step 707. The controller 370 controls the display unit 350 to display a screen according to the user's checking operation, in step 708. For example, when the controller 370 detects that the user has checked the received event message, it controls the display unit 350 to display the content of the event (state information) that occurred in a specific electronic device. As shown in screen 801 of FIG. 8, the controller 370 controls the display unit 350 to display a pop-up window 800 showing a type of electronic device where the event occurred (e.g., a washing machine) and the content of the event (e.g., "Washing cycle has been completed"). The pop-up window 800 may further show a control item (e.g., OK button) for executing a message checking operation, and a control item (e.g., FORWARD button) for executing an event message forwarding function.

After displaying the event message the controller 370 detects a user's forward request, in step 709. For example, if the user selects a control item for executing an event message forwarding operation on the pop-up window 800, the controller 370 detects that the user has requested the event message forwarding function.

The controller 370 outputs a user interface supporting the forwarding function, in step 711. For example, as shown in screen 803 of FIG. 8, the controller 370 controls the display unit 350 to display a user interface that includes an first area 810 showing content of the event (state information) and a second area 830 allowing the user to select one or more items where the content is to be forwarded (e.g., a target device). As shown in screen 803, an electronic device where an event occurred (e.g., a washing machine) and the content of the event ("Washing cycle has been completed") are displayed on the first display area 810. The user may correct the content of the event or add content to the first display area 810. The second area 830 provides information regarding target users to whom event messages can be forwarded, and their location information. The second area 830 allows the user to select the target users. In addition, the user interface may further include a control item (e.g., FORWARD button) 850 allowing the user to execute the forwarding function to the selected target users and control item (e.g., CANCEL button) allowing the user to cancel the forward function.

Referring back to FIG. 7, the user selects a target user to whom the event is to be forwarded via the user interface, in step 713. The controller 370 determines whether a forward request is made with respect to an event message, in step 715. For example, the user selects one or more target users to which the event message is forwarded via the user interface, and then operates the control item for executing the forwarding function. Therefore, the controller 370 determines whether the user operates the control item for executing the forwarding function via the user interface.

If the controller 370 ascertains that a forwarding request is not made with respect to an event message at step 715, the methodology returns to step 711. If the controller 370 ascertains that a forwarding request is made with respect to an event message at step 715, the event message is forwarded, in step 717. For example, the controller 370 may forward the received event message to user equipment used by the selected target user. Although not shown in FIG. 7, an embodiment of the present invention may be implemented such that the controller 370 determines whether the event message is corrected, if the controller 370 ascertains that the event message is not corrected, it performs a forward operation based on the event message transmitted from the management apparatus 200, and if the controller 370 ascertains that the event message is corrected, it performs a forward operation based on the event message that has been received.

If the controller 370 ascertains that the user has not checked the received event message at step 705, it identifies the type of event, in step 719. The controller 370 determines whether the type of event corresponds to an urgent event, in step 721. For example, the controller 370 identifies whether the event message corresponds to an event with a high level of urgency or a low level of urgency.

If the controller 370 ascertains that the event that occurred in an electronic device has a low level of urgency, it performs an operation corresponding to the event, in step 723. For example, after a preset period of time has elapsed, the controller 370 re-informs that the event message has been received, manages or stores the received event message in the user equipment until the user checks, and/or reports that the event message has not been checked to the management apparatus 200.

If the controller 370 ascertains that the event that occurred in an electronic device has a high level of urgency, the controller 370 waits a preset period of time, in step 725. The controller 370 detects whether the preset period of time has expired, in step 727.

If the controller 370 ascertains that the preset period of time has not expired, the controller performs a corresponding operation, in step 729. For example, the controller 370 continues to perform the counting operation or repeatedly outputs an alarm signal to inform that the event message has been received, until the preset waiting period of time elapses.

If the controller 370 ascertains that the preset period of time has expired, the controller creates a message indicating that the user has not checked the event message and transmits the message to the management apparatus 200, in step 731.

As described above, the system and method according to the present invention can selectively feed back information regarding events that have occurred when a number of electronic devices in a certain area operate, considering user situations. Specifically, the system and method can perform a selective transmission of messages regarding events that have occurred when electronic devices operate, considering user situations.

The system and method according to embodiments of the present invention can selectively transmit events that have occurred when electronic devices operate, considering a variety of situations, such as, for example, the types of events, the types of target electronic devices, the target users, the locations of target users, and the states of target electronic devices. Thus, corresponding events are fed back to the most proper target user via an optimal notification mode. The system and method according to embodiments of the present invention can perform a selective transmission of messages regarding events by electronic devices, thereby reducing the creation and transmission of unnecessary messages in the system, which prevents overloading of the system managing electronic devices.

The system and method according to embodiments of the present invention can execute a feedback function in a variety of environments (e.g., houses, offices, hospitals, factories, etc.), where a number of electronic devices form a network. The system and method can notify an optimal user of events that occurred when electronic devices operate in a variety of environments, in an optimal notification mode, where the optimal user can optimally process corresponding events. The system and method can provide an optimal environment where events that occurred when electronic devices operate can be optimally processed. The system and method can allow users to efficiently and easily control electronic devices in a network.

As described above, the system and method for transmitting messages related to the operations of electronic devices, according to embodiments of the present invention can be implemented with program commands that can be conducted via various types of computers and recorded in computer-readable recording media. The computer-readable recording media contain program commands, data files, data structures, or the like, or a combination thereof. The program commands recorded in the recording media may be designed or configured to comply with the invention, or may be software well-known to the ordinary person skilled in the art.

The computer-readable recoding media includes hardware systems for storing and conducting program commands. Examples of the hardware systems may include magnetic media such as a hard disk, a floppy disk, a magnetic tape, optical media such as a CD-ROM and a DVD, Magneto-Optical Media such as a floptical disk, a ROM, a RAM, and a flash memory. The program commands include assembly language or machine code complied by a complier and a higher level language interpreted by an interpreter. The hardware systems may be implemented with at least one software module to comply with embodiments of the present invention.

While the invention have been shown and described with reference to certain embodiments thereof, it will be understood by those skilled in the art that various changes in form and detail may be made therein without departing from the spirit and scope of the invention as defined by the appended claims.

What is claimed is:

1. A method for transmitting messages related to operations of electronic devices, the method comprising;
receiving, at a management apparatus, an event notification message from a specific electronic device where an event occurs;
analyzing, at the management apparatus, the event notification message;
determining, at the management apparatus, one or more target devices, which are registered as target users of the specific electronic device, to report the event that occurred in the specific electronic device; and
transmitting, at the management apparatus, an event message corresponding to the event that occurred in the specific electronic device to the determined one or more target devices,
wherein the target devices are determined based on whether the one or more target devices are located indoors or outdoors.

2. The method of claim 1, wherein analyzing the event notification message comprises at least one of:
identifying a type of the specific electronic device transmitting the event notification message;
identifying a type of event corresponding to the event notification message;
identifying a target user according to the type of event;
identifying a type of an electronic device that the target user uses; and
identifying a state of the electronic device that the target user uses.

3. The method of claim 2, wherein determining the one or more target devices comprises determining the one or more target devices based on at least one of an urgency of the event that occurred, the target user, a location of one or more another electronic devices, the type of the one or more another electronic devices, or a state of the one or more another electronic devices.

4. The method of claim 3, wherein determining the one or more target devices comprises determining the one or more target devices based on an order of priority relating to an urgency of the event, the location of the one or more another electronic devices, a type of the target electronic device, and the state of the one or more another electronic devices.

5. The method of claim 3, wherein identifying a target user comprises:
extracting information on a target user who uses the specific electronic device from the event notification message if the event has a first level of urgency; and
extracting information on all target users who receive a message reporting the event if the event has a second level of urgency.

6. The method of claim 5, wherein determining the one or more target devices comprises:
detecting a location of each of the one or more another electronic devices that target users use; and
when the one or more another electronic devices are located indoors, determining which of the one or more another electronic devices used by the target users are turned on.

7. The method of claim 6, wherein determining the one or more target devices comprises:
when the one or more another electronic devices of target users comprise a plurality of target users which are located both indoors and outdoors, determining which of the one or more turned on another electronic devices used by at least one of the plurality of target users is located indoors; and
when the one or more another electronic devices are located outdoors, determining pieces of user equipment used by the target users.

8. The method of claim 6, wherein the one or more target device comprises at least one of a piece of the specific electronic device, which is used by a target user.

9. The method of claim 1, wherein the event message comprises:
an identifier indicating that the event message reports the event that occurred in the specific electronic device; and
state information reporting information regarding the specific electronic device where the event has occurred, and reporting content of the event that occurred in the specific electronic device.

10. A management apparatus comprising:
a communication module configured to support communication with a plurality of electronic devices; and
a controller configured to:
receive, at the management apparatus, an event notification message from a specific electronic device where an event occurs;
analyze, at the management apparatus, the event notification message;
determine, at the management apparatus, one or more target devices, which are registered as target users of the specific electronic device, to report the event that occurred in the electronic device; and
transmit, at the management apparatus, an event message corresponding to the event that occurred in the specific electronic device to the determined one or more target devices,
wherein the target devices are determined based on whether the one or more target devices are located indoors or outdoors.

11. The management apparatus of claim 10, wherein the controller is further configured to at least one of:
identify a type of the specific electronic device transmitting the event notification message;
identify a type of event corresponding to the event notification message;
identify a target user according to the type of event;
identify a type of an electronic device that the target user uses; and
identify a state of the electronic device that the target user uses.

12. The management apparatus of claim 10, wherein the controller is further configured to determine the one or more target devices based at least one of an urgency of the event that occurred, the target user, a location of one or more another electronic devices, the type of the one or more another electronic devices, and a state of a target electronic device.

13. The management apparatus of claim 12, wherein the controller is further configured to determine the one or more target devices according to an order of priority relating to the urgency of the event, the location of the one or more another electronic devices, the type of the one or more another electronic devices, and a state of the one or more another electronic devices.

14. The management apparatus of claim 12, wherein the controller is further configured to:
- detect a location of each of the one or more another electronic devices that target users use; and
- when the one or more another electronic devices are located indoors, determining which of the one or more another electronic devices used by the target users are turned on.

15. The management apparatus of claim 12, wherein the controller is further configured to:
- determine, when the one or more another electronic devices of target users comprise a plurality of target users that are located both indoors and outdoors, which of the one or more turned on another electronic devices used by at least one of the plurality of target user is located indoors; and
- when the one or more another electronic devices are located outdoors, determine pieces of user equipment used by the target users as the one or more target devices.

16. The management apparatus of claim 10, wherein the controller is further configured to:
- extract information on a target user who uses the specific electronic device from the event notification message if the event has a first level of urgency; and
- extract information on all target users who receive a message reporting the event if the event has a second level of urgency.

* * * * *

UNITED STATES PATENT AND TRADEMARK OFFICE
CERTIFICATE OF CORRECTION

| | |
|---|---|
| PATENT NO. | : 9,721,441 B2 |
| APPLICATION NO. | : 14/666978 |
| DATED | : August 1, 2017 |
| INVENTOR(S) | : Kangmin Lee et al. |

Page 1 of 1

It is certified that error appears in the above-identified patent and that said Letters Patent is hereby corrected as shown below:

In Claim 8, Line 1:
"The method of claim 6, wherein the one or more target"
Should be:
- The method of claim 1, wherein the one or more target -

Signed and Sealed this
Twenty-ninth Day of May, 2018

Andrei Iancu
*Director of the United States Patent and Trademark Office*